Sept. 16, 1969    J. CELADA ET AL    3,467,368
ORE-TREATING APPARATUS
Filed April 12, 1966    3 Sheets-Sheet 1
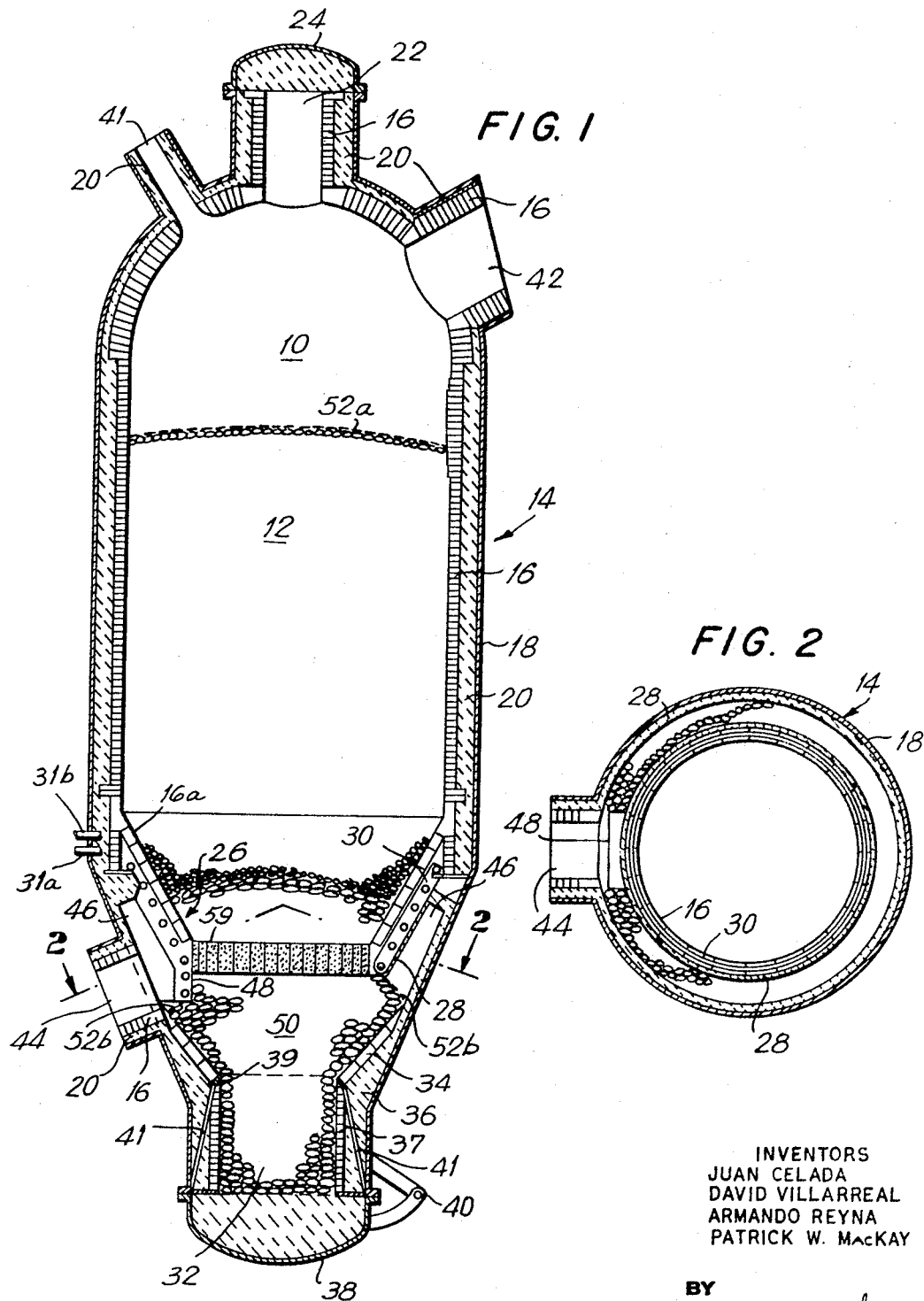
INVENTORS
JUAN CELADA
DAVID VILLARREAL
ARMANDO REYNA
PATRICK W. MacKAY
BY
Curtis, Morris & Safford
ATTORNEYS INVENTORS.
JUAN CELADA
DAVID VILLARREAL
ARMANDO REYNA
PATRICK W. MacKAY BY
*Curtis, Morris & Safford*
ATTORNEYS INVENTORS
JUAN CELADA
DAVID VILLARREAL
ARMANDO REYNA
PATRICK W. MacKAY

ATTORNEYS

United States Patent Office 3,467,368
Patented Sept. 16, 1969

3,467,368
ORE-TREATING APPARATUS
Juan Celada, David Villarreal, Armando Reyna, and Patrick W. MacKay, Monterrey, Nuevo Leon, Mexico, assignors to Fierro Esponja, S.A., Monterrey, Nuevo Leon, Mexico
Filed Apr. 12, 1966, Ser. No. 542,027
Int. Cl. F27b 1/14; F27d 5/00
U.S. Cl. 266—20                                        9 Claims

ABSTRACT OF THE DISCLOSURE

A fixed bed reactor especially adapted to be used in the gaseous reduction of iron ore to sponge iron is disclosed. In order to overcome the problems involved in using a foraminous grate, the ore body to be treated is supported in part by an internal frusto-conical baffle having a relatively large central opening and in part by a body of inert particulate refractory material at the bottom of the reactor. The internal baffle cooperates with the reactor wall to define an annular gas discharge passage. The baffle is water-cooled and details of its construction are disclosed.

---

The present invention relates to ore treating apparatus having particular application in the production of sponge iron from iron ore. It will be readily apparent, however, that the invention may be employed for processing ores other than iron ore.

Reactors embodying the present invention can be used with advantage in gaseous reduction processes of the type disclosed in Celada Patent No. 2,900,247. In this patent there is described and claimed a process for reducing iron ore to sponge iron by passing a reducing gas mixture at high temperature through a fixed bed of the ore in lump form. In the reactors previously used to carry out processes of this type the ore bed has been supported on foraminous grates or grids, usually water-cooled. While such an arrangement is suitable for some applications and may be employed with advantage in particular cases, it has been found that when the capacity of the equipment is scaled up to large dimensions the foraminous grates and grids may create certain problems. The useful life of these foraminous members may be adversely affected because of the high temperatures of the exit gases. In addition, the thermal cycling to which these foraminous members are subjected tends to decrease their useful life. Furthermore, these members may become subject to progressive plugging which decreases the effective gas flow. The plugging of the gas passages in the grates requires that they be cleaned, which results in undesirable shut-downs of the equipment.

It is an object of the present invention to provide new and improved ore treating apparatus.

It is another object of the present invention to provide new and improved ore treating apparatus of the type in which a metal oxide ore is reduced by subjecting a bed of this ore to a high temperature reducing gas mixture.

It is a further object of the present invention to provide ore treating apparatus which facilitates the batch handling of relatively large quantities of iron ore.

It is yet another object of the present invention to provide ore treating apparatus which is not subject to the limitations and shortcomings of presently available comparable equipment.

Additional objects of the present invention are to provide ore treating apparatus which is reliable in operation and requires relatively little maintenance and in which sponge iron may be produced at relatively low cost.

Ore treating apparatus constructed in accordance with the present invention does not require a foraminous plate, grate or grid upon which the metal oxide ore which is to be reduced by high temperature reducing gases rests. Instead, the internal contour of the reducing chamber is so shaped that a bed of particles forms at least two unconfined interfaces when the reducing chamber is charged. This bed of particles includes ore particles which are to be reduced and may or may not include particles of inert material upon which the ore particles rest dependent upon the circumstances. As used herein, the words "unconfined interface" refer to a surface of the bed of particles which defines the boundary between the bed of particles and free space and which does not act as a support surface for the bed. The reducing gas mixture is directed into the bed of particles through one or more of the unconfined interfaces so that it will traverse the ore bed and issue out through one or more different interfaces.

A reactor constructed in accordance with the present invention for producing sponge iron includes a vertically disposed, internally insulated cylindrical chamber which is charged with iron ore in lump form. A reducing gas at a temperature of approximately 2000° F. is passed vertically through the ore body to convert the ore to sponge iron. The temperature at which this takes place is well below the melting point of iron so that no fusion or sintering of the iron occurs. The resulting lumps of porous iron can be directly charged into the steel-making furnace or stored until needed.

A feature of the ore treating apparatus of the present invention is that the direction of gas flow through the ore bed may be alternated making possible a substantial improvement in thermal economy in reduction plants of large capacities.

Other objects of the present invention will become more apparent from the following description and drawings in which like reference characters denote like parts throughout the several views. In this specification and accompanying drawings there are shown preferred embodiments of the present invention; but it is to be understood that these embodiments are not intended to be exhaustive or limiting of the invention. On the contrary, the illustrated embodiments are given for the purpose of illustration only in order that others skilled in the art may fully understand the invention and the purposes thereof and the manner of applying it for practical use so that they may modify and adapt it in various forms each as may be best suited for the conditions of a particular use.

In the drawings:

FIGURE 1 is a vertical section of one embodiment of a sponge iron reactor constructed in accordance with the present invention;

FIGURE 2 is a horizontal section taken on line 2—2 of FIGURE 1;

Figure 3:
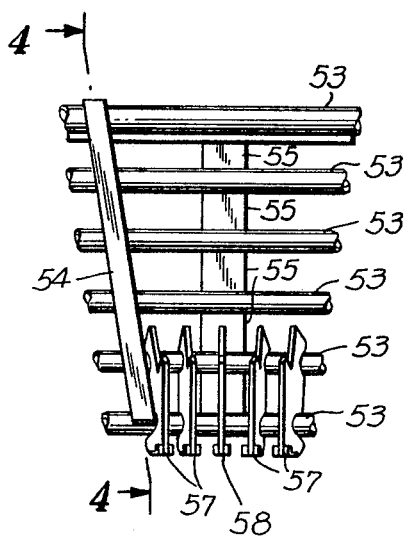
FIGURE 3 is a detailed showing of a portion of the sponge iron reactor of FIGURES 1 and 2.
Figure 4:
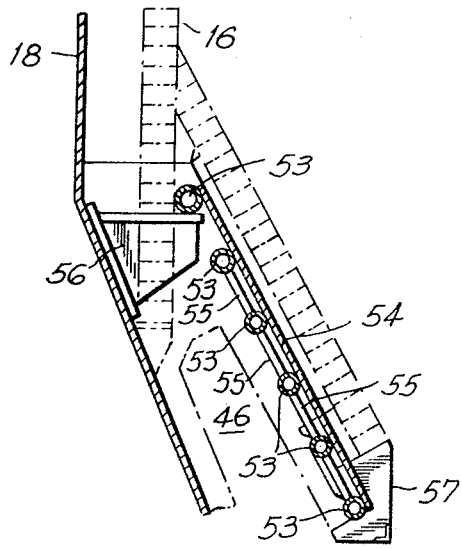
FIGURE 4 is a vertical section taken on line 4—4 of FIGURE 3.
Figure 5A:
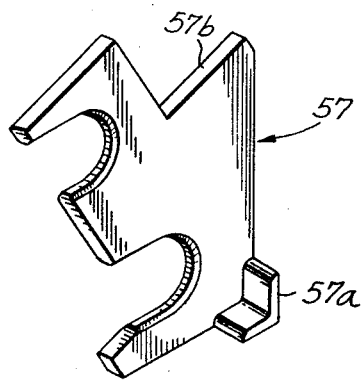
Figure 5B:
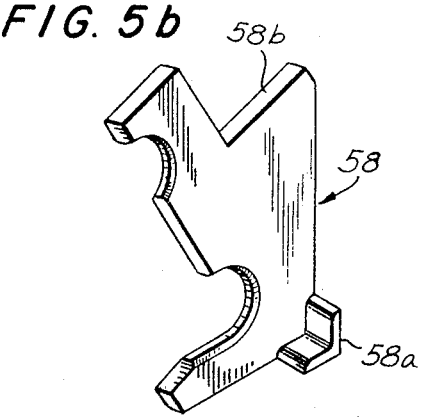
Figure 6:
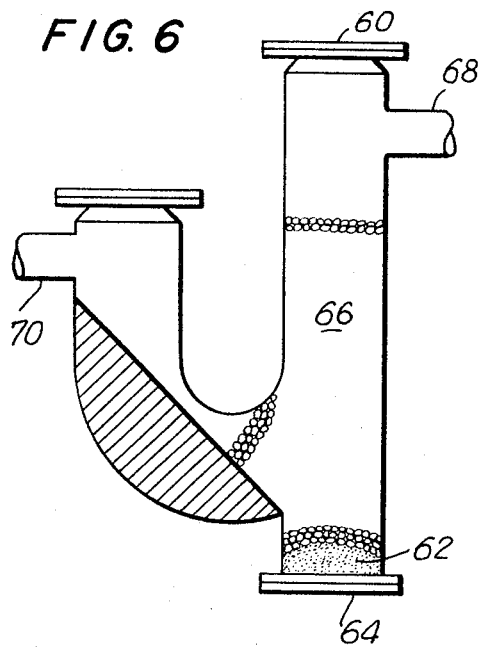
Figure 7:
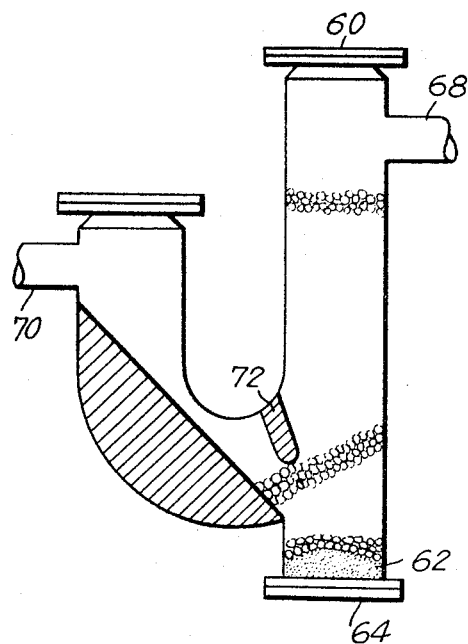
Figure 8:
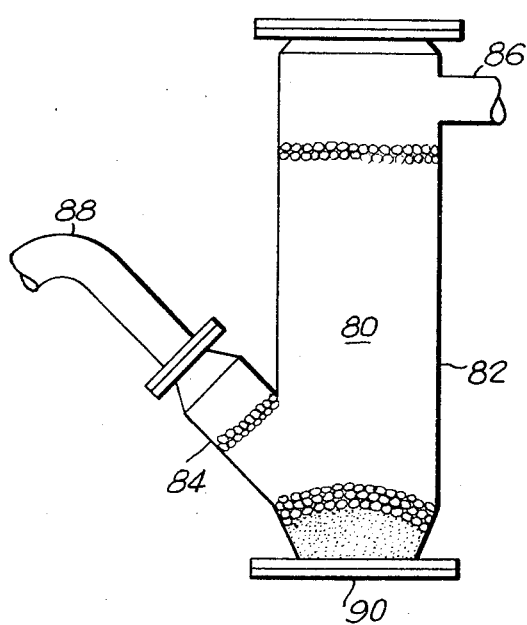

FIGURES 5a and 5b are perspective views of two components of the portion of the reactor shown in FIGURES 3 and 4; and FIGURES 6, 7 and 8 show, in simplified form, other embodiments of reactors constructed in accordance with the present invention.

The sponge iron reactor 14 shown in FIGURES 1 and 2 includes a chamber 10 in which iron ore 12, in lump form, is reduced to sponge iron. The chamber 10 is defined by a generally cylindrical wall lined with refractory brick 16 at its inner surface and a steel casing 18 at its outer surface. Interposed between the refractory brick lining 16 and the steel casing 18 is a layer of cast refractory material 20. The refractory brick lining 16 and the refractory material 20 serve to shield the steel casing 18 from the internal heat of the reactor.

The reactor 14 terminates in a hemisphere at the upper end. The chamber 10 is charged with the iron ore 12 by means of charging inlet 22 located at the top of the reactor 14. The refractory brick lining 16 and the thickness of cast refractory material 20 extend into the charging inlet 22. The charging inlet 22 is provided with a door 24 which is opened during the charging of the reactor and closed to form a tight seal during the reduction of the iron ore 12.

The reactor 14 terminates in a truncated conical section at the lower end. In particular, the reactor walls taper inward toward a discharge outlet 32. Located within the outer walls of the reactor at the bottom of the chamber 10 is an internal frusto-conical baffle 26. The inner wall of baffle 26 is lined with refractory brick 16a which extends completely around the baffle, while the outer wall of the baffle is lined with a thickness of refractory material 28 which extends almost completely around the baffle. Interposed between the refractory brick 16a and the refractory material 28 is a water-cooled metallic conical structure 30. The water cooling is provided to protect against the metallic structure 30 losing its physical form because of the internal heat of the reactor. Water is supplied through a pipe 31a and exits through a pipe 31b. The pipes 31a and 31b connect into the water cooling system by suitable conventional means.

The discharge outlet 32 has a conical entrance lined by hard refractory brick 34. The vertical walls of the discharge outlet 32 are lined with refractory material 36 and brick 37. A steel guard ring 39 is provided for support at the corner where the linings of bricks 34 and 37 meet. The ring 39 is supported by members 41. The discharge outlet 32 is provided with a door 38 which pivots about a pivot 40. The door 38 is opened to discharge the reactor and closed to form a tight seal prior to recharging the iron ore 12.

Hot reducing gas is supplied to the reactor through a gas inlet 42 located near the top of the chamber 10. The reducing gas leaves the reactor through a gas outlet 44 located at the lower end of the chamber 10. The refractory brick lining 16 and the cast refractory material 20 extend into both the gas inlet 42 and the gas outlet 44.

Reducing gas supplied to the reactor through a gas inlet 41 located near the top of the chamber 10. The cast refractory material 20 extends into the gas inlet 41.

The refractory material lining 28 on the outer wall of the frusto-conical baffle 26 extends around to the steel plate 18 and joins with the lining of refractory material 36 in discharge outlet 32 so that the outside wall of the frusto-conical baffle and the inside wall of the reactor form an annular passage 46. As best shown in FIGURE 2, the annular passage 46 extends completely around the lower end of the chamber. The annular passage 46 is in open communication with the gas outlet 44. An obstructing member 48, extending downward from the lower edge of the frusto-conical baffle 26 in the vicinity of the gas outlet 44, prevents the bed particles from falling into the gas outlet 44 and out of the reactor through the gas outlet 44. The cast refractory material 20 in the gas outlet 44 joins with the lining of refractory material 36 in discharge outlet 32.

As may be required for any given application, the gas outlet 44 may be located more conveniently at a higher point along the steel shell so that it may not be necessary to utilize an obstructing member such as 48.

Piled in the discharge outlet 32 and in the lower part of chamber 10 is a heel 50 of inert refractory material upon which the iron ore 12 rests when the chamber 10 is charged. By the term "inert" it is meant, a material which does not react chemically with the process gases and is capable of withstanding the imposed process temperatures without excessive degradation or change in its physical characteristics due to being exposed to such temperatures. In most practical large-scale fixed-bed reactors used for reducing metal oxides, and more particularly iron ores, a certain amount of channeling of the gas flow occurs, thereby producing a non-uniform gas flow across the cross-section of the bed. Thus, the particles located in the bottom of the reactor may, in some regions, be subjected to contact with less reducing gas than is required to achieve the desired degree of reduction. Consequently, a certain portion of the reduced ore may be incompletely reduced. The use of the inert heel 50 results in an improvement in the uniformity of gas flow across the cross-section of the lower portion of the ore bed and the gas pressure drop in the bottom zone of the reactor will be less than the pressure drop which would be observed if such an inert heel were not used. Dead spaces in the lower portions of the reducing chamber which might otherwise be filled with ore may be eliminated by the depositing of the inert heel material in these portions of the chamber.

The gas pressure drop of large-scale fixed-bed reactors is one of the fundamental operating variables of the process which affect the economy and desirability of the process. The pressure drop of the inert heel zone is determined to a large degree by the average particle size of the particles in the inert heel and by the average void volume between the particles of inert material. This latter factor is dependent upon the distribution of particle sizes about the average particle size; the void volume will tend to be large when the spread in particle sizes is small, that is, when all the particles have about the same size. Thus, by establishing the correct particle size of the inert material, the pressure drop in the bottom of the reactor may be held within desired limits. This function of the inert heel 50 is of extreme value in achieving feasibility of large-scale commercial plants for the reduction of metal oxides in fixed-bed reactors.

The gas pressure drop developed as the gas flows downward through the bed tends to be greatest in the narrowing lower half of the frusto-conical baffle 26 where the diameter decreases to its smallest value. To avoid a high pressure drop in this region the inert heel material is charged to the level illustrated.

The level to which the inert heel shall be charged also will depend upon the range of particle sizes, specific weight and void volume of the ore bed. For example, if the ore bed 12 consists of small particles, then large lump inert material should be charged to a level somewhat above the smallest diameter of the frusto-conical baffle 26 as shown in FIGURE 1 in order to prevent the particles from being transported out of the reactor by the gas as well as to prevent a high gas pressure drop in the narrow lower portion of the frusto-conical baffle. By charging inert material to this level, a confined interface of inert material and ore exists within the bed of particles in the frusto-conical baffle 26. Thus, inert particles form the unconfined lower or outlet interface and gas flows through the inert part of the bed located between the confined ore-inert material interface and the unconfined lower interface. If the inert material were charged to a lower level and the same size particles of ore were being processed, the pressure drop through the frusto-conical baffle 26 would increase because smaller particle ore would lie in the baffle area instead of the larger lump inert material.

The size of the iron ore particles cannot, in all cases, be increased to create larger gas passages. Larger particle ore makes the reduction more difficult due to the fact that more time is required to heat the interior of the ore particle. In addition, the diffusion lengths for the gaseous reactants and products become excessively long in larger particles thus resulting in a poor reaction rate. On the other hand, it is possible that in certain instances, for example, when processing ores other than iron ore, larger ore particles and lower gas velocities may be employed. Under these conditions it may not be necessary to charge the inert material to the level indicated, so that the lower unconfined interface may be formed of ore particles. This is illustrated in FIGURES 6, 7 and 8.

Various materials may be used for the inert heel 50. One such class of materials is the so-called "gangue" materials sometimes associated with iron ore deposits at mine sites. The preferred gangue materials contain alumina and ore otherwise capable of withstanding the handling and process temperatures in the bottom of the reactors. In addition, waste refractory bricks suitably sized for use in the inert heel may also be employed. Also, certain non-magnetic resistant slag wastes discarded from subsequent melting and refining operations which are carried out on sponge iron to produce pig iron or steel ingots may also be employed.

In the operation of the sponge iron reactor shown in FIGURES 1 and 2, the discharge outlet door 38 is initially closed and sealed and the charging inlet door 24 is opened. The chamber 10 is charged through the charging inlet 22 with the inert refractory material which forms the heel 50.

Next, the chamber 10 is charged with the iron ore 12 through the charging inlet 22 with the resulting bed of iron ore resting upon the heel 50. Some of the considerations as to the type and amount of inert refractory material to be used have been given above. The chamber 10 is so shaped that the bed of particles forms two interfaces. The first, or inlet interface, exists across the top surface of the iron ore bed and is shown by the dotted line 52a. This interface defines the boundary between the iron ore bed 12 and the volume of free space above the ore bed. The second, or outlet interface, exists across the surface of the particles which have settled in the vicinity of the annular passage 46 and is shown by the dotted lines 52b. This interface defines the boundary between the bed particles of the annular passage 46 and the volume of free space above this portion of the bed. The free volume bounded by the inside wall of the reactor 14, the lining 28 on the outer wall of the frusto-conical section 26, and the outlet interface 52b constitutes a gas collection chamber or plenum which is in open communication with the gas outlet 44.

After the chamber 10 is charged with the iron ore 12, the charging inlet door 24 is closed and sealed. Reducing gas, heated to a temperature in the range of 1700° F. to 2000° F., is introduced into the chamber through the reducing gas inlet 42. The reducing gas enters the bed of iron ore 12, through the inlet interface 52a and passes downward through the main portion of the bed. The direction of reducing gas flow changes after it has passed downwardly through the bed of particles resting in the frusto-conical baffle 26. At this point, the reducing gas moves across the bed of particles toward the upwardly and outwardly extending passage defined by frusto-conical baffle 26 and the inside wall of the reactor. The reducing gas issues out of the fixed bed of particles through the outlet interface 52b. The gas collection chamber or plenum above the outlet interface 52b serves as a manifold to conduct the reducing gas from the outlet interface to the gas outlet 44.

The cross-sectional areas of the inlet and outlet interfaces are so dimensioned that the velocity of the gas will be less than the critical velocity required to induce or sustain appreciable particle transport at the outlet interface. This critical velocity is a function of temperature, pressure and molar flowrate of the gas as well as the size and specific weight of the particles at the outlet interface.

After the iron ore has been reduced, the discharge outlet door 38 is opened and the reduced ore along with the inert heel 50 are discharged from the reducing chamber. The resultant mixture of reduced ore and inert heel material is subjected to a suitable separation operation after which the reduced ore may be passed directly to a steel-making furnace.

The separated inert heel material may then be subjected to suitable treatment so as to remove any fraction of the inert heel material which may no longer be reusable in subsequent reducing operations of the reactor. Despite the selection of particular inert material, it is still possible that this material may undergo certain secondary chemical or physical changes during the reduction operation. In such cases, the non-reusable inert material must be removed. For example, size degradation may occur so as to render a given fraction of the inert material unusable. In this case, the finer particles may be removed from the recovered inert material by screening.

Various techniques may be employed in separating the inert refractory material from the reduced metal oxide. When processing iron ore, the inert material is preferably non-magnetic so that it may be separated from the magnetic reduced iron ore by means of a magnetic separator. When the reactor is employed to reduce different metal oxides which are non-magnetic, the inert material may be magnetic so that it may be separated from the reduced ore which is non-magnetic also by means of a magnetic separator. Other potentially applicable separation techniques include the use of electrostatic separators, centrifugal separators and mechanical gates or diverters. In addition, flotation or other techniques based upon differences in specific weight may also be employed.

Although the sponge iron reactor of FIGURES 1 and 2 has been described as employing a heel of inert material upon which the ore bed rests during the reduction of the ore, it should be pointed out that such a heel is not necessary in all situations where reactors constructed in accordance with the present invention are employed in processing metal ores. The inert material may be eliminated entirely, for example, in a case where a certain degree of incomplete reduction of a portion of the ore bed is tolerable. Therefore, the upper unconfined interface of the bed of particles will in nearly all cases be formed by iron ore particles, while the lower unconfined interface may in some cases be formed by particles of inert material as shown in FIGURES 1 and 2 and in other cases by ore particles.

FIGURES 3 and 4 show in detail the construction of the frusto-conical baffle 26. The water for cooling the baffle 26 passes through pipes 53 held together by an elongated member 54 and a plurality of short members 55. The pipe system is secured to the steel casing 18 of the reactor by means of a platform 56. Suspended from and secured to the two lowermost pipes 53 are a plurality of radial wear plates 57 and 58, the functions of which will be described in detail hereinafter. The wear plates preferably extend around the full perimeter of the baffle 26. As shown in FIGURE 1, interposed between the radial wear plates is hard refractory material 59. This refractory material 59 is supported by means of flanges 57a and 58a on the wear plates 57 and 58, respectively, best shown in the perspective views of FIGURES 5a and 5b. The need for two differently shaped wear plates arises because of the particular means employed for holding together the pipes 53. It is seen that wear plate 58 is employed at those points where the short members 55 join together the pipes 53. The wear plates are shaped to facilitate attachment to the pipes 53 in the manner indicated and once attached the lining of bricks 16a may be formed by piling the bricks on surfaces 57b and 58b of the wear plates.

The need for the wear plates 57 and 58 generally arises when the abrasive action of the descending reactor charge as it is removed from the reactor is high. The construction of radial wear plates of carbon steel or stainless steel disposed radially about the circumference of the baffle 26 with hard refractory material interposed between the plates withstands high abrasive action of the reactor charge. The wear plates are attached to the water-cooling system to provide heat dissipation for the plates so as to minimize the adverse effects which thermal cycling could cause in the wear plates were they not provided with a heat sink.

The particular arrangement of the wear plates 57 and 58 results in a relatively small total metallic surface of the wear plates being exposed to the hot reduction gases. Such an arrangement is desirable in that large continuous metallic surfaces exposed to contact with hot reducing gas mixtures are apt to suffer creeping deformation and are preferably avoided. This deformation is due to the fact that the thermal expansion of each imaginary incremental area of a large metallic surface in contact with the gases would sum up thus resulting in a sizeable deformation. The stresses set up in a large continuous metallic surface exposed to contact with the gases would cause a "creep" effect in the deformations, that is, the metal, when subjected to many thermal cycles of heating and cooling, will not return to its original dimensions when it is cooled, but rather a small fraction of the deformation will remain after each thermal cycling of the piece. After many cycles, the "creep" or cumulative deformation effect is apt to be large.

The obstructing member 48 at the gas outlet 44 is preferably formed by employing longer radial wear plates at this point in the perimeter of the baffle 26.

FIGURES 6, 7 and 8 show, in simplified form, other embodiments of reactors constructed in accordance with the present invention. Detailed descriptions of the structure and operation of these reactors have been omitted since they are generally similar to the reactor of FIGURES 1 and 2.

The reactor shown in FIGURE 6 is termed a J-shaped reactor. This reactor is charged through a charging inlet 60 with a heel 62 of inert refractory material after the discharge outlet 64 is closed and sealed. Next, an ore bed 66 is formed as the reactor is charged with ore through the charging inlet 60. The size of the heel 62 is such that the bed of ore forms two interfaces, one near the top of the tall leg of the J and one at the bend of the J. The short leg of the J has a floor which is inclined at 45°, for example, so that the ore which spills over toward the short leg will slide down to and out of the discharge outlet 64 as the chamber is discharged subsequent to the completion of the processing of the ore.

Reducing gas enters the reactor through a reducing gas inlet 68 located at the top of the tall leg of the J and passes through the bed of ore 66 from the upper interface near the top of the tall leg of the J to the lower interface at the bend of the J. The reducing gas exits from the reactor through a reducing gas outlet 70 located at the top of the short leg of the J.

The reactor shown in FIGURE 7 is a variation of the J-shaped reactor of FIGURE 6. In FIGURE 7, a refractory wedge 72 protrudes within the reactor so as to limit the amount of spillage of ore into the short leg of the J. The arrangement forces the reducing gas to sweep lower into the bed of ore to result in a more complete processing of the ore throughout the entire bed.

The reactor shown in FIGURE 8 is similar to the J-shaped reactors of FIGURES 6 and 7. In the reactor of FIGURE 8, the bulk of ore bed 80 is located in a vertically disposed chamber 82. A portion of ore bed 80 falls into a cylindrical side outlet 84 communicating with the chamber 82. One interface of the ore bed is formed near the top of the chamber 82, while a second sloping interface is formed in the side outlet 84. Reducing gas enters the reactor through a reducing gas inlet 86 located at the top of the chamber 82 and exits from the reactor through a reducing gas outlet 88 located at the upper end of the side outlet 84. The side outlet 84 is inclined at 45°, for example, so that upon discharge of the reactor, the reduced ore in the side outlet will slide down to and out of the discharge outlet 90.

Although all the embodiments of the invention have been described as having the reducing gas pass through the bulk of the ore bed from top to bottom, it should be noted that the reducing gas may pass through the bed from bottom to top. In such a case, the reducing gas inlets would serve as outlets, while the reducing gas outlets would serve as inlets. Furthermore, the direction of reducing gas flow may be alternated from one batch of ore to another or it may be alternated during the reduction of a particular batch of ore. Such alternations in the direction of flow of the reducing gas makes possible a substantial improvement in thermal economy in reduction plants of large capacities.

It should also be noted that the lower part of the embodiments shows in FIGURES 6, 7 and 8 can be charged with an inert heel as may be required to minimize the zones of low gas-to-ore contact.

From the foregoing, it will be readily apparent that the present invention has a number of worthwhile and practical advantages. One of these advantages is that the cleaning problem associated with fixed crevices or gas passages in foraminous plates, grates or grids is eliminated— the outlet interface particles are removed along with the rest of the bed as each batch of reduced ore is discharged. Thus, in the present invention, the crevices or gas passages inherent in the void volume in the bed of particles is substituted for the fixed crevices or gas passages of the foraminous plates, grates or grids.

Another advantage of the present invention is that since the previously required structures at the outlet interface have been eliminated, the peak temperatures are no longer limited by the characteristics of the materials selected for use in these structures. This, in turn, allows the reaction process to be carried out at a higher average bed temperature in terms of increased reduction reaction rate.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for the gaseous reduction of metal oxide ore comprising, in combination, an elongated, vertically disposed reaction chamber, said chamber having a charging inlet located near the top thereof through which the ore in particulate form can be charged to form a bed of said ore in said chamber, a discharge outlet for the reduced material and closure therefor at the bottom of said chamber, a stationary body of inert particulate refractory material at the bottom of said chamber positioned and arranged to support said ore bed, a first gas flow passage extending through the wall of said chamber near the top thereof, a frusto-conical baffle converging downwardly from the lower portion of the wall of said chamber, the lower side of said baffle cooperating with the adjacent portion of the wall of said chamber to define a second gas flow passage extending through said wall, at least a portion of said second gas flow passage extending upwardly and outwardly in relation to said body of inert material whereby as said chamber is charged with inert particulate material and particulate ore, particulate matter will enter the lower portion only of said second passage to form an unconfined surface through which process gas can readily flow.

2. Apparatus according to claim 1 wherein the top of said body of inert refractory material is above the lower end of said second gas flow passage.

3. Apparatus according to claim 1 wherein the top of said body of inert refractory material is below the lower end of said second gas flow passage.

4. Apparatus according to claim 1 wherein said frusto-conical baffle is water-cooled.

5. Apparatus according to claim 1 wherein the chamber is of circular cross-section.

6. Apparatus for the gaseous reduction of metal oxide ore comprising in combination an elongated vertically disposed reaction chamber, said chamber having a charging inlet near the top thereof through which the ore in particulate form can be charged to form a bed of said ore in said chamber, a discharge outlet for the reduced material and closure therefor at the bottom of said chamber, a first gas flow passage extending through the wall of said chamber near the top thereof, a frusto-conical baffle converging downwardly from the lower portion of the interior wall of said chamber, the lower side of said baffle cooperating with the adjacent portion of the wall of said chamber to define a second gas flow passage extending upwardly and outwardly in relation to the bottom of said chamber, said baffle being formed of a frustoconically arranged series of cooling water tubes having a layer of refractory material superposed thereon.

7. Apparatus according to claim 6 wherein said baffle has at its lower periphery an abrasion resistant ring.

8. Apparatus according to claim 7 wherein said abrasion resistant ring comprises a series of vertically and radially arranged hardened metal wear plates with inserts of refractory material therebetween.

9. Apparatus according to claim 8 and wherein said wear plates are mounted on said cooling tubes and cooperate with said tubes to support said refractory inserts.

References Cited

UNITED STATES PATENTS

| | | | |
|---|---|---|---|
| 645,179 | 3/1900 | Miles | 266—10 XR |
| 817,414 | 4/1906 | Brown | 266—10 XR |
| 1,656,828 | 1/1928 | Powell | 65—3 |
| 2,509,854 | 5/1950 | Bailey et al. | |
| 2,627,399 | 2/1953 | DeVaney. | |
| 2,670,946 | 3/1954 | Royster | 266—20 |
| 2,756,130 | 7/1956 | Bearer. | |
| 2,996,292 | 8/1961 | Graf et al. | |
| 2,502,501 | 4/1950 | Armitage | 75—33 X |

FOREIGN PATENTS 345,981  12/1921  Germany.

J. SPENCER OVERHOLSER, Primary Examiner

R. SPENCER ANNEAR, Assistant Examiner

U.S. Cl. X.R.

263—30